United States Patent Office 3,396,279
Patented Aug. 6, 1968

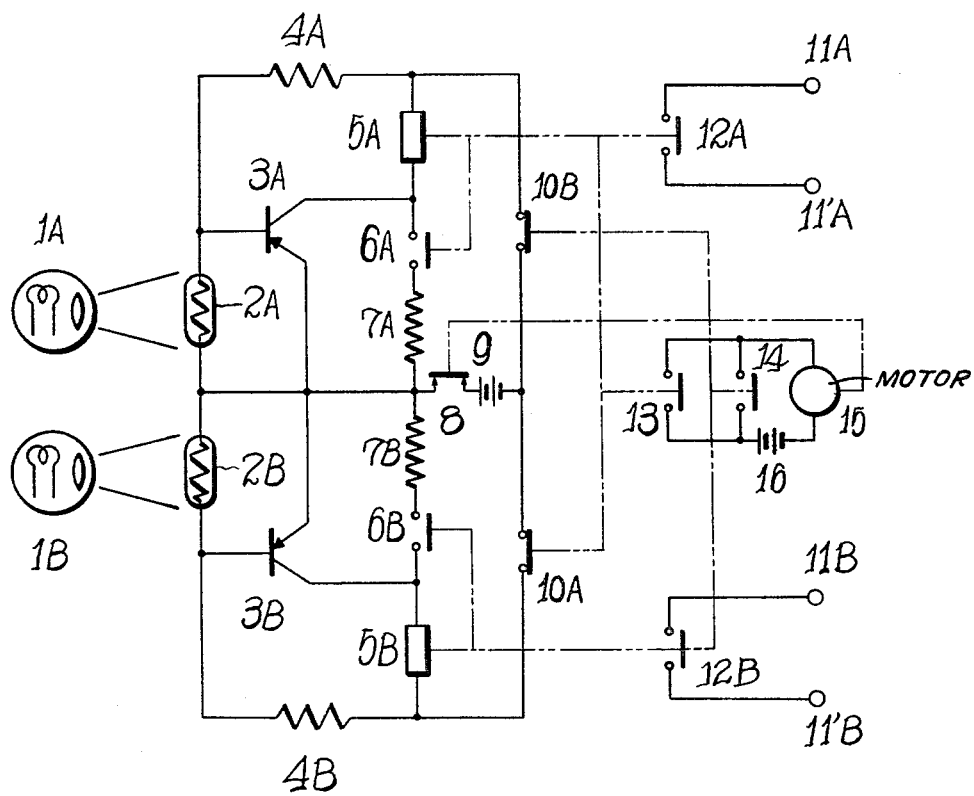

3,396,279
APPARATUS FOR DETECTING PASSAGE OF MOVING OBJECTS
Yoshio Tokuda, Tokyo, Japan, assignor to Kinkohsha Insatsu Kabushiki Kaisa (Rep: Kinsen Tokuda), a corporation of Japan
Filed Jan. 6, 1965, Ser. No. 423,742
Claims priority, application Japan, Apr. 17, 1964, 39/29,828
2 Claims. (Cl. 250—221)

ABSTRACT OF THE DISCLOSURE

This invention relates to a directional detector adapted to detect directions in which men and objects move along predetermined paths and to operate sound means, indicating means, guiding means and recording means in accordance with the detected directions. It consists essentially of a circuit having two detectors, photoelectric elements and two relays. A detector is placed at the entrance and at the exit of an area which is a passageway for men or objects.

---

It will be very convenient if there is provided an apparatus adapted for distinguishably detecting incoming and outgoing men and vehicles, guiding the incoming men and vehicles, expressing thanks to the outgoing men and vehicles, and telling the incoming and outgoing of men and vehicles to the host of a building, store or the like, the apparatus which is placed at the entrance and exit of the building, store or the like and which can be small-sized, simplified in construction, made free of trouble and manufactured at a low cost.

An object of this invention is to provide a directional detector having a relatively simplified circuit and including only two detectors, photoelectric elements corresponding thereto and two relays, the detector which is adapted to be placed at the entrance and exit of a building, a room or the like for distinguishably detecting incoming and outgoing men and vehicles, thereby operating the sound means in such a manner as to give greeting and information to each of the incoming men and vehicles by playing for a predetermined period of time a tape on which is recorded such greeting and information and tell the incoming of men and vehicles to the host by sounding a buzzer.

It is another object of this invention to distinguishably detect incoming and outgoing men and vehicles with said detector placed at the entrance and exit of a building, a room or the like, thereby operating electric light indicating means in such a manner as to give greeting and information to each of the incoming men and vehicles by lighting one of the indicating means for a predetermined period of time, tell the incoming of men and vehicles to the host, express thanks and invitation to the next visit to each of the outgoing men and vehicles by lighting the other indicating means, and tell the outgoing of men and vehicles to the host.

It is another object of this invention to distinguishably detect incoming and outgoing men and vehicles with said detector placed at the entrance and exit of a building, a room or the like, thereby actuating a mechanical switch in such a manner as to operate transferring apparatus such as escalator and elevator for each of the incoming men and vehicles for a predetermined period of time, and operate the same transferring apparatus in the opposite direction for each of the outgoing men and vehicles for a predetermined period of time.

It is a further object of this invention to distinguishably detect incoming and outgoing men and vehicles with the detector placed at the entrance and exit of a building, a room or the like, thereby operating different counting devices for each of incoming and outgoing men so as to count backward the number of the men who still remain in the building, room or the like.

It is a further object of this invention to distinguishably detect incoming and outgoing men and vehicles with the detector placed at the entrance and exit of a building, a room or the like, thereby operating recording means in such a manner as to actuate independent cameras for the respective incoming and outgoing men.

It is still a further object of this invention to place the detector on one vehicle track so as to operate traffic signally means in such a manner as to keep one vehicle from coming in from one direction when another vehicle comes in from the opposite direction.

The accompanying drawing shows the circuit diagram of a preferred embodiment of this invention. This invention will be described hereinbelow with reference to the drawing. 1A and 1B indicate projectors, 2A and 2B indicate photoelectric elements, 3A and 3B indicate amplifiers, 4A and 4B indicate resistors, 5A and 5B indicate relay coils, 6A and 6B indicate contacts, 7A and 7B indicate resistors, 8 indicates a contact, 9 indicates a power source, 10A and 10B indicate contacts, 11A, 11A', 11B and 11B' indicate terminals, 12A and 12B indicate contacts, and 15 indicates a motor. The contacts 6A, 12A and 13 are closed when a current flows through the relay coil 5A, while the contact 10A is opened when a current flows through the relay coil 5A. The contact 8 is adapted to be closed when the motor 15 reaches a predetermined angle after it has been operated for a predetermined period of time.

The projector 1A and the photoelectric element 2A corresponding thereto are mounted externally of the entrance and exit of the building, room or the like, while the projector 1B and the photoelectric element 2B corresponding thereto are mounted internally of said entrance and exit. The terminals 11A and 11A' are connected with the corresponding terminals of the sound means adapted for playing a tape on which are recorded words for welcoming the incoming men and vehicles, while the terminals 11B and 11B' are connected with the corresponding terminals of another sound means adapted for playing a tape on which are recorded words for expressing thanks to the outgoing men and for inviting them to the next visit. Thus, when a man or a vehicle comes in passing between the porjector 1A and the photoelectric element 2A, a current flows through the relay coil 5A, thereby closing the contact 6A so that the relay coil 5A is self-held, and thereby similarly closing the contact 12A so that a current flows in the sound means so as to give the words for welcome. At this time, since the contact 10A is simultaneously opened, no current flows through the relay coil 5B and the contacts 6B and 12B are not closed, thus the lines of the system B are rendered ineffective.

In this way, the contact 13 is also simultaneously closed, so that the motor 15 rotates so as to reach a predetermined angle upon completion of operation of the tape type sound means. Then, the contact 8 is opened, permitting no current to flow through the relay coil 5A to cause the contact 6A, 12A and 13 to be opened and the contact 10A to be closed and returned to its original position, thereby stopping reproduction of the tape A. On the other hand, outgoing men first pass between the projector 1B and the photoelectric element 2B, so that a current flows through the relay coil 5B, thereby closing the contact 6B and causing the relay coil 5B to be self-held. Similarly, the contact 12B is closed so that a current flows in the tape type sound means B, thereby giving the words for expressing thanks and invitation to the next visit. At this time, the contact 10B is simultaneously opened, permitting no current to flow through the relay coil 5A and preventing the contacts 6A and 12A from being closed, thereby rendering the lines of the system A to be ineffective. Simultaneously, the contact 14 is closed, so that the motor 15 rotates so as to reach a predetermined angle upon completion of operation of the other sound means in the same period of time as the former sound means. Then, the contact 8 is opened, permitting no current to flow through the relay coil 5B, so that the contacts 6B, 12B and 14 are opened, while the contact 10B is closed and returned to its original position, thereby the operation of the sound means or tape recorder B is stopped.

In this way, the apparatus of this invention is placed at the entrance and exit of a building, a room or the like so as to accomplish the duties of speeding and welcoming as a substitute for a guard or a guide, and it is made simple in construction and free of trouble, and manufactured at a low cost. Further, the terminals 11A and 11A′ are connected with one sound means and the other terminals 11B and 11B′ are connected with the other sound means adapted for production of different voices, so that the incoming and outgoing of men and vehicles can be distinguishably informed to the host of a building, a room or the like.

Also, the terminals 11A and 11A′ are connected with one electric light indicating device, and the other terminals 11B and 11B′ are connected with the other electric light indicating device, so that an indicating plate on which are indicated the words of welcoming and information is lighted when the incoming men and vehicles pass between the projector 1A and the photoelectric element 2A, while another indicating plate on which are indicated the words of thanks and invitation to the next visit is lighted when the outgoing men and vehicles pass between the projector 1B and the photoelectric element 2B. Further, it is possible to distinguishably inform to the host of a building, a room or the like as to the incoming and outgoing of men and vehicles by means of two indicating plates one which is adapted to indicate the incoming of men and vehicles and the other of which is adapted to indicate the outgoing of men and vehicles. The indicating devices can be utilized in such a manner as described above.

On the other hand, the projector 1A and the photoelectric element 2A are placed at the downstairs entrance portion of a transferring apparatus such as an escalator, while the projector 1B and photoelectric element 2B are placed at the upstairs portion of the escalator. The terminals 11A and 11A′ are connected with an electric motor of the escalator, and the terminals 11B and 11B′ are reversely connected with said electric motor. Thus, the escalator will move toward upstairs so as to carry an incoming man when the incoming man passes between the projector 1A and the photoelectric element 2A, and during the upward movement of the escalator, no current flows through the terminals 11B and 11B′, so that the operation of the escalator will not be reversed on the way. On the other hand, when a returning man passes between the projector 1B and the photoelectric element 2B respectively placed upstairs, the motor will be reversely rotated, thereby moving the escalator toward downstairs so as to carry the returning man down to the downstairs. Further, by placing the projector 1A and the photoelectric element 2A at the downstairs entrance and exit of the elevator of a three-dimensional parking station and the projector 1B and the photoelectric element 2B at the entrance and exit of the elevator on each floor, and by connecting the terminals 11A and 11A′ to the power lines of an electric motor of the elevator and the terminals 11B and 11B′ reversely to said power lines, the elevator will be automatically moved upwards when an automobile having come in from the entrance of the parking station passes between the projector 1A and the photoelectric element 2A and rides on the elevator, while the elevator will be moved downwards to the contrary and carry the automobile down to the entrance and exit when the automobile passes the projector 1B and the photoelectric element 2B and rides on the elevator in attempt to go out from the parking floor thereof to the floor of the entrance and exit.

Further, with the terminals 11A and 11A′ connected to one electric counter and with the other terminals 11B and 11B′ connected to another electric counter, it is possible to separately count the number of the incoming men, vehicles and objects and that of the outgoing men, vehicles and objects and to concurrently count the number of the men, vehicles and objects.

By placing the projectors 1A and 1B and the photoelectric elements 2A and 2B at the entrance and exit of a building, a room or the like and by connecting the terminals 11A, 11A′ and 11B, 11B′ with separate electric cameras respectively, the recording means can be operated in such a manner that photographs of the incoming and outgoing men and objects can be separately taken.

Further, the projector 1A and the photoelectric element 2A are placed at the entrance of one vehicle track, the project 1B and the photoelectric element 2B are placed at the other entrance thereof, the terminals 11A and 11A′ are connected with signalling means of the entrance at which are placed the projector 1B and the photoelectric element 2B, and the terminals 11B and 11B′ are connected to other signalling means of the entrance at which are placed the projector 1A and the photoelectric element 2A, so that when a vehicle enters one vehicle track from one entrance, the signalling means at the other entrance can indicate "stop" for a period of time corresponding to the passage of the vehicle.

I claim:
1. A directional detector, comprising a first and second projector (1A and 1B) and two photoelectric elements (2A and 2B) corresponding thereto which are respectively placed in a passageway for men, vehicles and the like;
a circuit comprised of a first and second photoelectric element (2A and 2B), a power source (9) and a power contact (8) interposed between said two photometric elements (2A and 2B) and the power source (9);
a circuit comprised of the first photoelectric element (2A), a first resistor (4A), a first resistor contact (10B) and the power source (9);
a circuit comprised of the second photoelectric element (2B), a second resistor (4B), a second resistor contact (10A) and the power source (9);
a circuit branched from between the first resistor (4A) and its contact (10B) and comprised of a first relay coil (5A), its contact (6A) and its resistor (7A) and connected with the circuit between the first photoelectric element (2A) and the power contact (8);
a circuit branched from between second resistor (4B) and its contact (10A) and comprised of a second relay coil (5B), its contact (6B) and its resistor (7B) and connected with the circuit between the second photoelectric element (2B) and the power contact (8);
a circuit branched from between the first photoelectric element (2A) and its resistor (4A) and connected with the circuit between the first relay coil (5A) and its contact (6A) through a first amplifier (3A);
a circuit branched from the circuit between the second photoelectric element (2B) and the second resistor (4B) and connected with the circuit between the second relay coil (5B) and its contact (6B) through a second amplifier (3B);
a circuit branched from the circuit between the first photoelectric element (2A) and the power contact (8) so as to lead to said first amplifier (3A);
a circuit branched from between the second photo- electric element (2B) and power contact (8) so as to lead to said second amplifier (3B);

terminals (11A and 11A') having a second contact (12A) interposed therebetween, terminals (11B and 11B') having a first contact (12B) interposed therebetween;

a circuit comprised of a motor (15), a power source (16), and a first motor contact (13);

and a circuit comprised of the motor (15), a second motor contact (14) and the power source (16), wherein the first relay contact (6A), second contact (12A) and first motor contact (13) are adapted to be closed and the second resistor contact (10A) is adapted to be opened when a current flows through the first relay coil (5A) and wherein the second relay contact (6B), first contact (12B) and second motor contact (14) are adapted to be closed and the second resistor contact (10B) is adapted to be opened when a current flows through the second relay coil (5B), and wherein the second terminals (11A and 11A') are adapted to be connected with one utilization means, and the first terminals (11B and 11B') are adapted to be connected with another utilization means.

2. A directional detector, comprising:
two light sources (1A, 1B),
electric motor means (15),
two optical detector means, each including at least one photoelectric element (2A or 2B) and at least one relay means (5A, 6A, 10A, 12A, 13 or 5B, 6B, 10B, 12B, 14),
said two optical detector means being disposed in opposing relationship with said light sources across a passageway, said relay means including normally open contacts (12A or 12B) for operating indicator means to be connected to respective output terminals (11A, 11A' or 11B, 11B'), normally open contacts (13 or 14) for actuating said electric motor means (15) normally closed contacts (10A or 10B) actuated by the relay means of the other of said optical detector means for opening the circuit of the remaining optical detector means, and normally open self-maintaining contacts (6A or 6B) for maintaining said optical detector means energized, and a normally closed contact (8) actuated by said electric motor means (15) for momentarily opening the circuit of both optical detector means whereby the self-maintaining contacts (6A, 6B) are allowed to open.

References Cited

UNITED STATES PATENTS

| | | | |
|---|---|---|---|
| 3,176,797 | 4/1965 | Dinning | 250—221 X |
| 3,191,048 | 6/1965 | Cowen | 250—221 |
| 3,207,266 | 9/1965 | Hornung | 250—221 X |

RALPH G. NILSON, *Primary Examiner.*

M. A. LEAVITT, *Assistant Examiner.*